(12) United States Patent
Kiriyama et al.

(10) Patent No.: US 6,633,594 B1
(45) Date of Patent: Oct. 14, 2003

(54) METHOD FOR CHANGING A WAVELENGTH OF A LASER LIGHT

(75) Inventors: Hiromitsu Kiriyama, Kyoto (JP);
Yoichiro Maruyama, Kyoto (JP);
Takashi Arisawa, Kyoto (JP)

(73) Assignee: Japan Atomic Energy Research Institute, Tokyo (JP)

( * ) Notice: Subject to any disclaimer, the term of this patent is extended or adjusted under 35 U.S.C. 154(b) by 135 days.

(21) Appl. No.: 09/640,747

(22) Filed: Aug. 18, 2000

(30) Foreign Application Priority Data

Aug. 18, 1999 (JP) .......................................... 11/231255

(51) Int. Cl.[7] ................................................ H01S 3/10
(52) U.S. Cl. .......................................... 372/22; 372/27
(58) Field of Search .............................. 372/21, 22, 27

(56) References Cited

U.S. PATENT DOCUMENTS

| | | | | |
|---|---|---|---|---|
| 5,278,852 A | * | 1/1994 | Wu et al. ..................... | 372/22 |
| 5,321,709 A | * | 6/1994 | Beausoleil .................. | 372/22 |
| 5,517,525 A | * | 5/1996 | Endo et al. .................. | 372/21 |
| 5,732,095 A | * | 3/1998 | Zorabedian ................. | 372/22 |
| 5,936,983 A | * | 8/1999 | Yusong et al. .............. | 372/22 |
| 5,940,418 A | * | 8/1999 | Shields ....................... | 372/22 |
| 5,943,351 A | * | 8/1999 | Zhou et al. ................. | 372/22 |
| 6,047,011 A | * | 4/2000 | Cook .......................... | 372/22 |
| 6,141,369 A | * | 10/2000 | Seelert et al. ............... | 372/97 |
| 6,327,281 B1 | * | 12/2001 | Yin ............................. | 372/22 |
| 6,347,102 B1 | * | 2/2002 | Konno et al. ............... | 372/22 |
| 6,381,255 B1 | * | 4/2002 | Van Saarloos et al. ...... | 372/9 |
| 6,480,325 B1 | * | 11/2002 | Batchko et al. ............ | 359/330 |

OTHER PUBLICATIONS

David Eimerl, "*Quadrature Frequency Conversion*", IEEE Journal of Quantum Electronics, vol. QE–23. No. 8, pp. 1361–1371, Aug. 1987.

* cited by examiner

*Primary Examiner*—Paul Ip
*Assistant Examiner*—Phillip Nguyen
(74) *Attorney, Agent, or Firm*—Banner & Witcoff, Ltd.

(57) ABSTRACT

The efficiency of wavelength conversion of laser light can be improved by allowing incident laser light to pass through nonlinear optical crystals a multiple of times. In converting the wavelength of laser light to generate second- and higher harmonic waves, a returning mirror, a polarizer and nonlinear optical crystals are combined and the rotation of polarized light is utilized to allow the incident laser light to undergo multiple passes through the nonlinear optical crystals so that it can be converted in wavelength with higher efficiency.

8 Claims, 5 Drawing Sheets

METHOD FOR CHANGING A WAVELENGTH OF A LASER LIGHT

BACKGROUND OF THE INVENTION

This invention relates to a method by which laser light is allowed to pass many times through a nonlinear optical crystal so that the efficiency of wavelength conversion of the incident laser light is sufficiently enhanced to generate higher harmonic waves (light) such as second, third and fourth harmonics (light).

Conventionally, wavelength conversion of laser light is accomplished by single pass of the laser light through a nonlinear optical crystal. A typical application of this wavelength conversion technique is the generation of a second harmonic wave, as shown schematically in FIG. 1. Incident laser light 1 is allowed to pass only once through a single nonlinear optical crystal 2, whereupon a second harmonic wave (light) 3 is obtained together with the laser light 1 that has simply passed through the crystal without experiencing a conversion in wavelength.

On account of several limitations including nonuniformity in the temporal and spatial intensity of the incident laser light and phase mismatch in the nonlinear optical crystal, the system shown in FIG. 1 allows for only a single pass of the incident laser light through the nonlinear optical crystal and the efficiency of wavelength conversion that can be achieved is usually no more than about 50%. In other words, about one half of the energy of the incident laser light is simply wasted without contributing to the conversion of its wavelength.

SUMMARY OF THE INVENTION

An object, therefore, of the present invention is to provide a method for efficient wavelength conversion of laser light by allowing it to pass a multiple of times through more than one nonlinear optical crystal.

This object of the invention can be attained by providing two nonlinear optical crystals in a wavelength conversion system. The incident laser light whose wavelength was not changed by the first nonlinear optical crystal is launched into the second nonlinear optical crystal, where it undergoes due wavelength conversion. As a result, the energy of the incident laser light is efficiently utilized in wavelength conversion.

Specifically, the two nonlinear optical crystals are disposed such that their optical axes (e-axes) are perpendicular to each other. With this arrangement, the higher harmonic wave generated by passage through the first nonlinear optical crystal does not pass along the e-axis of the second nonlinear optical crystal and, hence, will not revert to the original incident laser light upon leaving the second nonlinear crystal. As a result, the incident laser light is efficiently converted in wavelength.

More specifically, the two nonlinear optical crystals are combined with a returning mirror and a polarizer so that the rotation of polarized light is utilized to allow the incident laser light to undergo multiple passes through the two nonlinear optical crystals. Given this parts arrangement, the incident laser light that was not heretofore converted in wavelength by single pass is reflected and allowed to pass many times through the two nonlinear optical crystals. As a result, the incident laser light is efficiently converted in wavelength.

Figure 1:
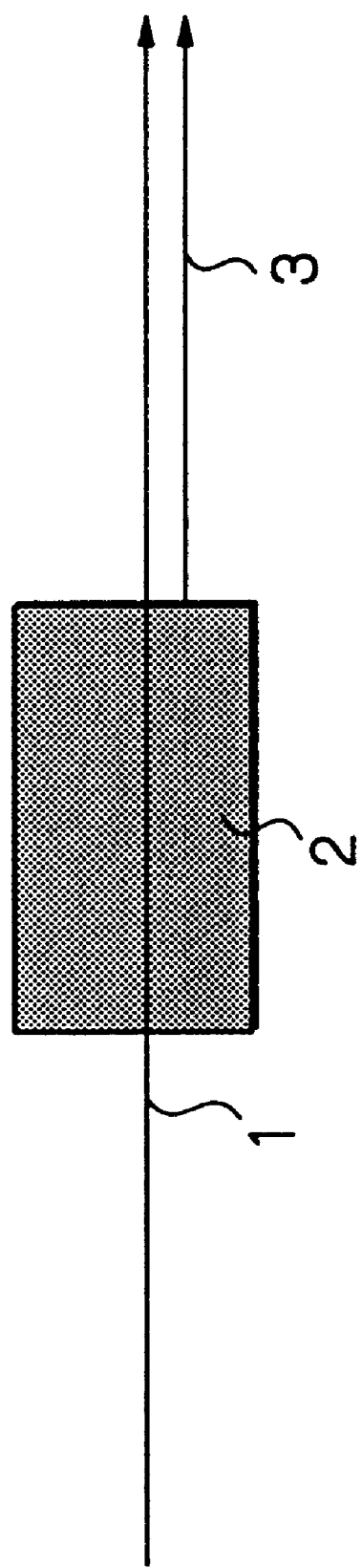
FIG. 1 is a diagrammatic representation of a system for second-harmonic generation which is a typical conventional application of wavelength conversion.

In the drawings, numeral 1 represents incident laser light (fundamental wave); 2 is a type II phase-matched nonlinear optical crystal; 3 is a second-harmonic wave; 4 is a polarizer; 5 is a returning mirror; 6 is a total reflection mirror; 7 is a half-wavelength plate; 8 is a quarter-wave plate; 9 is incident laser light consisting of a fundamental wave and a second-harmonic wave that vibrate in crossed directions; 10 is a type III phase-matched nonlinear optical crystal; 11 is a third-harmonic wave; 12 is incident laser light consisting of second-harmonic waves that vibrate in crossed directions; 13 is a type I phase-matched nonlinear optical crystal; and 14 is a fourth-harmonic wave.

DETAILED DESCRIPTION OF THE INVENTION

The method of the invention for wavelength conversion of laser light is described below with reference to the accompanying drawings. The method is applied to generate a second-harmonic wave as in the conventional case shown in FIG. 1. A system for second-harmonic generation according to a first embodiment of the invention is shown diagrammatically in FIG. 2 and consists of a polarizer 4, returning mirrors 5, a total reflection mirror 6, a half-wavelength plate 7, a quarter-wavelength mirror 8 and two nonlinear optical crystals 2. Each returning mirror 5 has a coating that reflects incident laser light (fundamental wave) 1 with high efficiency but which does not reflect a second-harmonic wave 3. The fundamental wave 1 vibrating in a plane parallel to the paper passes through the polarizer 4 to be reflected by the first returning mirror 5. The reflected fundamental wave 1 passes through the half-wavelength plate 7 whose axis of leading phase is inclined by 22.5 degrees from the horizontal, so its vibrating plane is rotated by 45 degrees from the horizontal, causing conversion to a second-harmonic wave 3 by passage through the two type II phase-matched nonlinear optical crystals 2 with their e-axes crossing each other at right angles (the e-axis of one nonlinear optical crystal 2 is parallel to the paper and the e-axis of the other is normal to the paper). The generated second-harmonic wave 3 is output to an external circuit after passing through the one-quarter wavelength plate 8 and the second returning mirror 5.

That portion of the fundamental wave 1 which emerges unconverted in wavelength after single pass is transmitted through the quarter-wavelength plate 8 whose axis of leading phase is inclined by 45 degrees from the vibrating plane of the fundamental wave 1. The transmitted fundamental wave 1 is reflected by the second returning mirror 5 and makes a second pass through the quarter-wavelength plate 8, whereupon the direction of vibration of the fundamental wave 1 is rotated by 135 degrees from the horizontal. The rotated fundamental wave is launched again into the two nonlinear optical crystals and have its wavelength converted. The generated second-harmonic wave 3 is output to an external circuit after passing through the half-wavelength plate 7 and the first returning mirror 7.

That portion of the fundamental wave 1 which was not converted in wavelength even by the double pass described above is transmitted through the half-wavelength plate 7 and reflected by the first returning mirror 5 to be incident on the polarizer 4. Since the fundamental wave 1 is polarized in a plane perpendicular to the paper, it is reflected by the polarizer 4 and the total reflection mirror 6 and travels in the same path as the first.one. As a result, the fundamental wave 1 propagates a total of four times through the two nonlinear optical crystals. Since that portion of the fundamental wave 1 which was not converted in wavelength by single pass propagates a total of eight times through the nonlinear optical crystals 2, efficient wavelength conversion can be achieved.

In addition to second-harmonic generation, wavelength conversion of laser light is commonly applied to third-and fourth-harmonic generation. The application of the conversion method of the present invention to these cases is described below.

Figure 4:
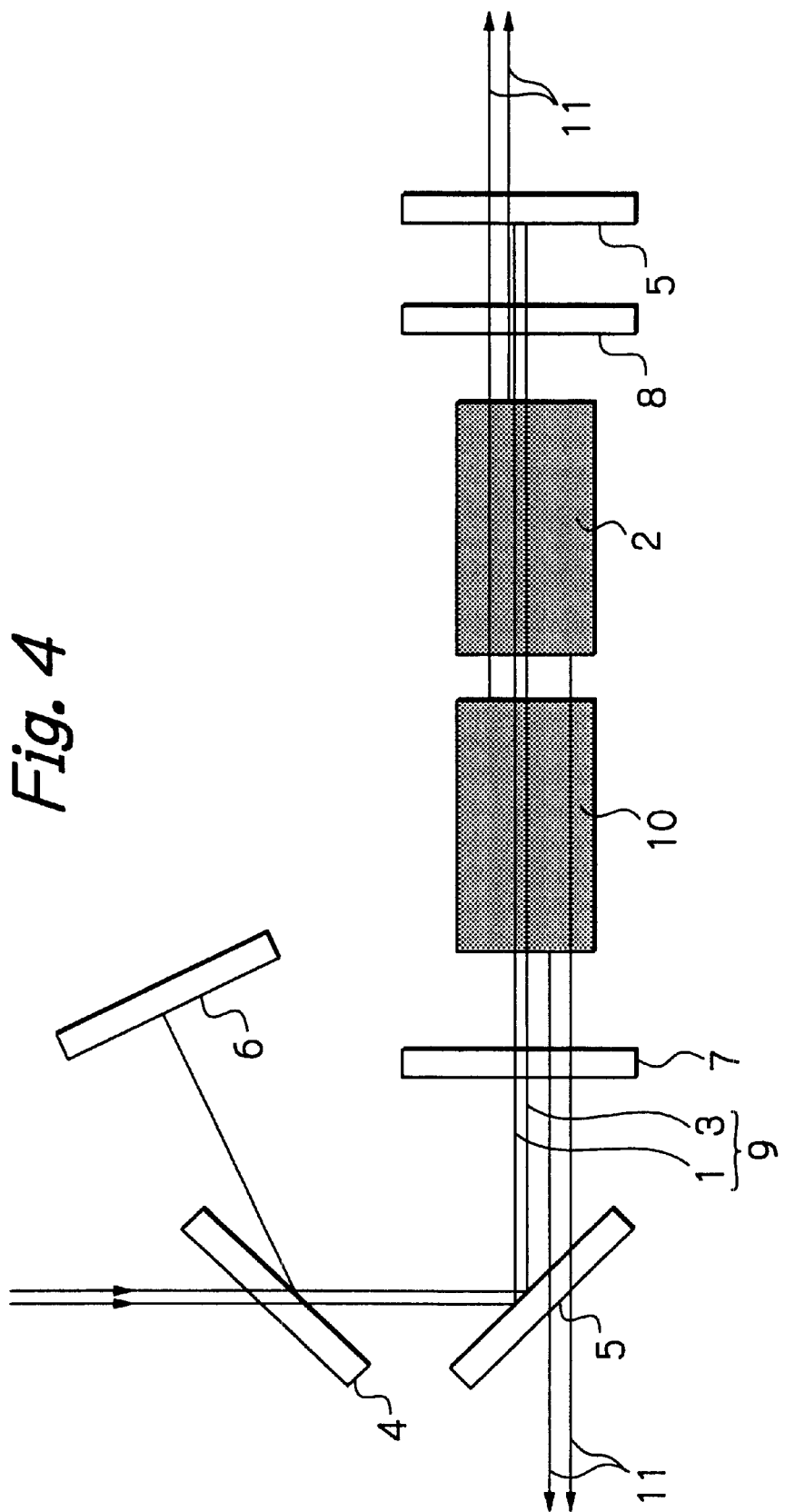
FIG. 4 is a diagrammatic representation of a system for third-harmonic generation according to another embodiment of the invention.

A system for third-harmonic generation is shown in FIG. 4. Incident laser light 9 consists of a fundamental wave 1 (which is the incident laser light in FIG. 1) and a second-harmonic wave 3 (which is generated in FIG. 1) and these two waves vibrate in crossed directions. Two nonlinear optical crystals that have their e-axes crossing each other at right angles are used; one is a type II phase-matched crystal 2 (e.g. KDP or, potassium dihydrogen phosphate) and a type III phase-matched crystal 10 (e.g. LFM or lithium formate monohydrate). If the fundamental wave 1 is allowed to be incident in alignment with the e-axis of the crystal 2 and the second-harmonic wave 3 in alignment with the e-axis of the crystal 10, the wavelength conversion method of the invention can be applied to the generation of a third-harmonic wave 11.

Figure 5:
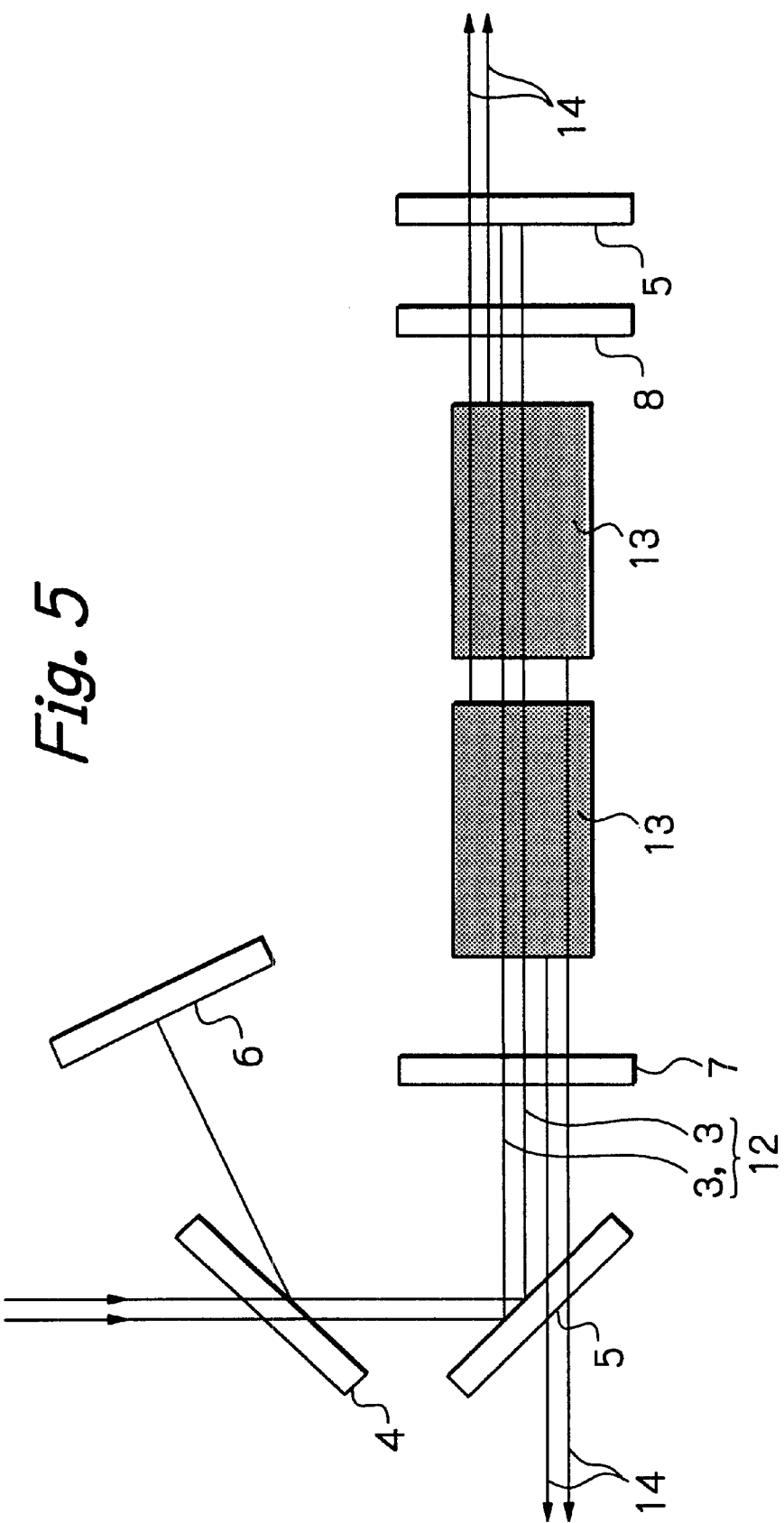
FIG. 5 is a diagrammatic representation of a system for fourth-harmonic generation according to yet another embodiment of the invention.

A system for fourth-harmonic generation is shown in FIG. 5. Incident laser light 12 consists of two second-harmonic waves 3 (as generated in FIG. 2) which vibrate in crossed directions. Two type I phase-matched crystals 13 (e.g. BBO or beta-barium borate) having their e-axes crossing each other at right angles are used as nonlinear optical crystals. If the laser light 12 consisting of the second-harmonic waves 3 is allowed to be incident in alignment with the e-axes of the crystals 13, the wavelength conversion method of the invention can be applied to the generation of a fourth-harmonic wave 11.

EXAMPLE

Figure 2:
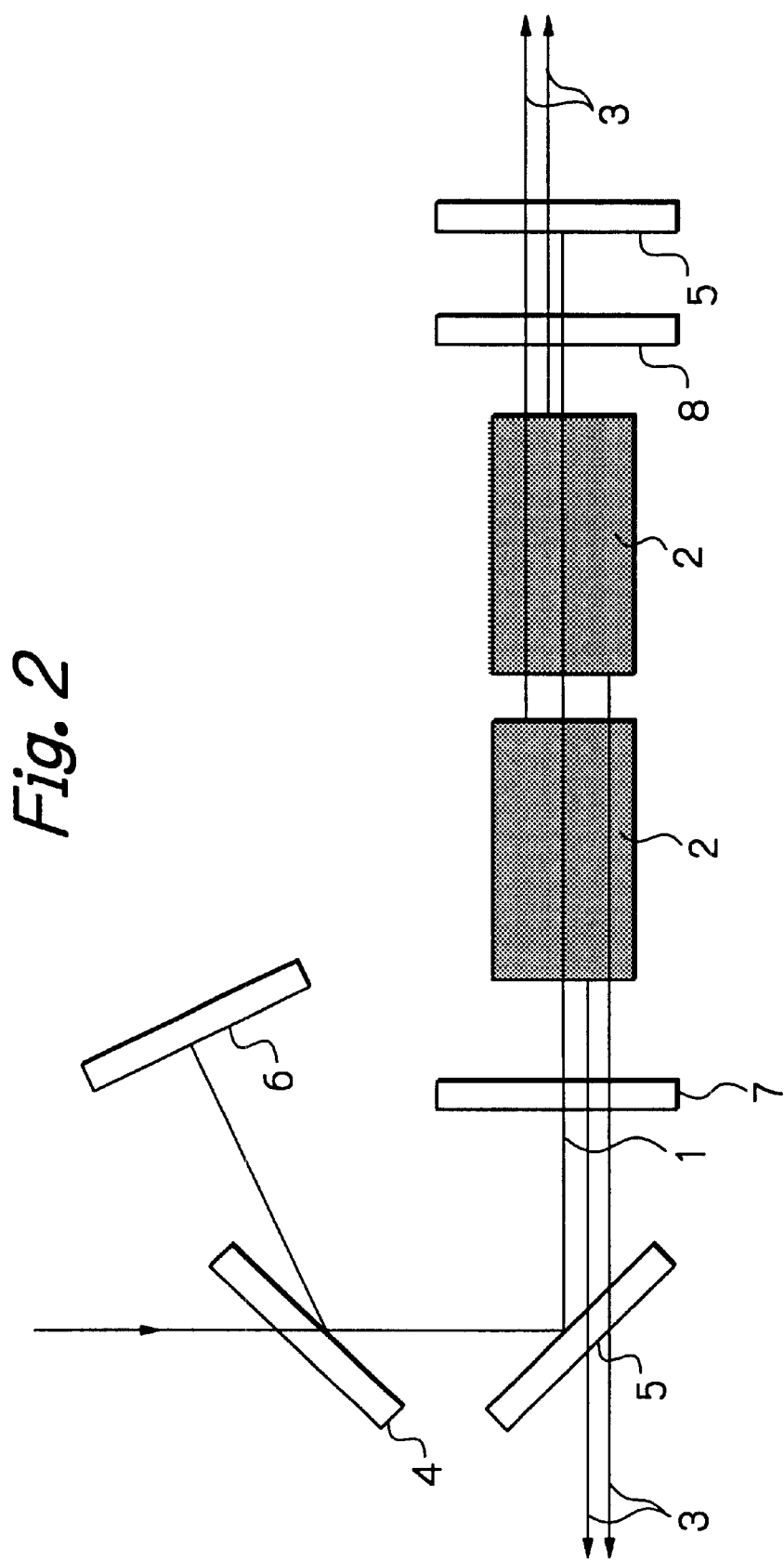
FIG. 2 is a diagrammatic representation of a system for second-harmonic generation according to an embodiment of the invention.

The present invention is now described in greater detail with reference to the following actual experiment which was conducted with a setup of the design shown in FIG. 2. The incident laser light was emitted from a commercial, lamp-excited Nd:YAG laser (Continuum Powerlite). The output light of this laser was characterized by an energy of up to 1 J per pulse, an operating wavelength of 1064 nm, a pulse width of 15 ns (FWHM), a repetition rate of 10 Hz, a beam diameter of 8.2 mm and oscillation in linear polarization. Two type II phase-matched KTP (potassium titanyl phosphate) cubes (10×10×10 mm) were used as nonlinear optical crystals. Both the entrance and exit faces of each crystal were provided with a coating that would not reflect the wavelength of either 1064 nm (for the fundamental wave) or 532 nm (for the second-harmonic wave).

Figure 3:
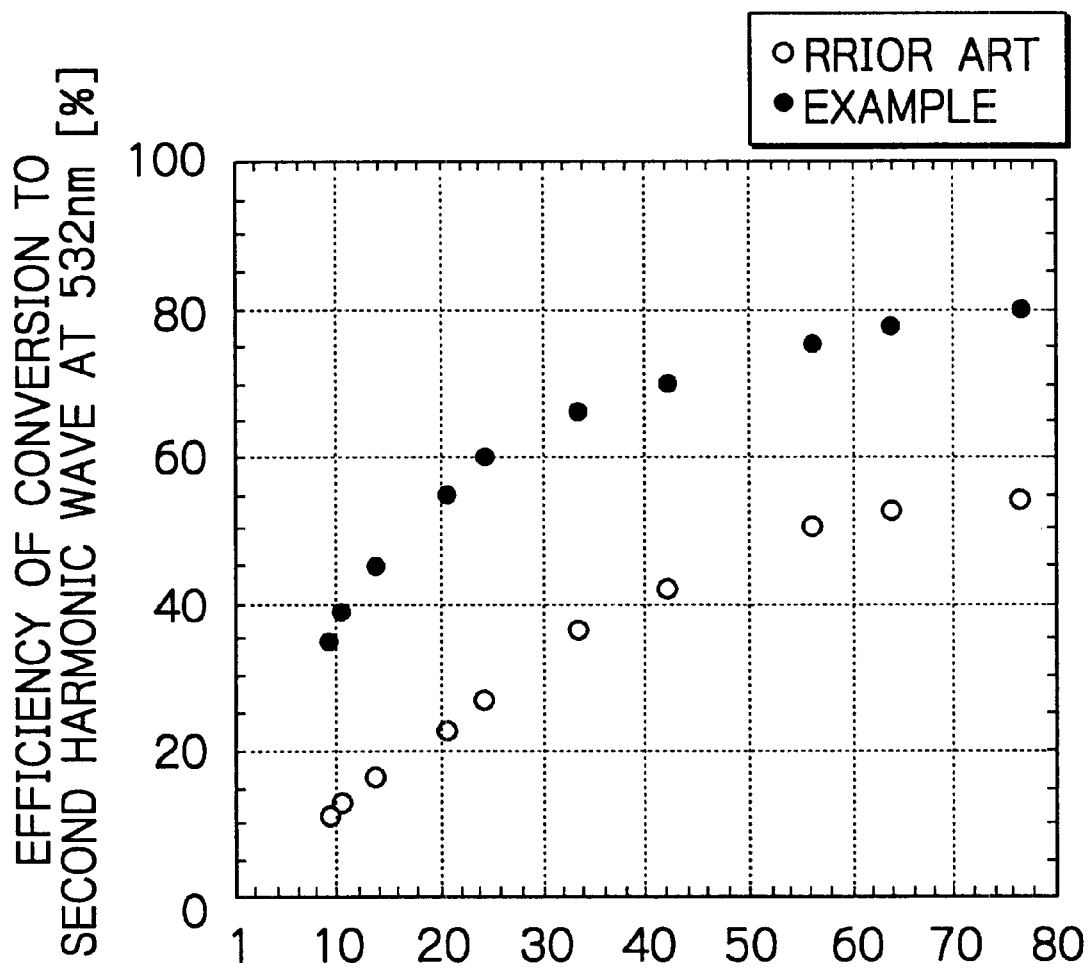
FIG. 3 shows a comparison between the conventional case and the embodiment of the invention as regards the efficiency of second-harmonic conversion vs the intensity of incident laser light.

FIG. 3 shows the efficiency of second-harmonic conversion vs the intensity of incident laser light. The open circles in the graph refer to the case of allowing the incident laser light to pass only once through a single nonlinear optical crystal (as in the conventional system) and the solid dots refer to the case of allowing the incident laser light to make four passes through the two nonlinear optical crystals (as in the Example). The industrial utility of the wavelength conversion method of the invention is obvious since it achieves a higher conversion efficiency than the prior art.

EFFECT OF THE INVENTION

By the method of the present invention, laser light launched into nonlinear optical crystals can be converted in wavelength with high efficiency to generate high-power harmonics.

What is claimed is:

1. A method for converting the wavelength of laser light to generate higher harmonic waves in a system for higher harmonic wave generation having a first and a second nonlinear optical crystals such that their optical axis (e-axis) are perpendicular to each other, a polarizer, a first and a second returning mirrors, a total reflection mirror, a half-wavelength plate and a quarter-wave plate, comprising:

passing incident laser light of a fundamental wave through the polarizer onto the first returning mirror;

passing the laser light reflected from the first returning mirror through the half-wavelength plate into the first optical crystal;

passing the reflected laser light through the first optical crystal to convert the wavelength of the laser light;

passing the laser light of the converted wavelength through the second optical crystal without converting the wavelength thereof to obtain a second-harmonic wave;

passing the portion of the reflected laser light, which is not converted in the wavelength thereof in the first optical crystal, through the second optical crystal to convert the wavelength of the laser light and obtain a second-harmonic wave; and forming an enhanced second harmonic light through the quarter-wave plate and the second returning mirror.

2. The method according to claim 1, wherein the portion of the fundamental wave, which is not converted in the wavelength thereof after single pass of the first and second optical crystals, is transmitted through the quarter-wavelength plate, reflected on the second returning mirror, and passes backward through the second optical crystal and the first optical crystal to obtain a second-harmonic wave through the half-wavelength plate and the first returning mirror.

3. The method according to claim 1, wherein the fundamental wave and the second-harmonic wave are used as the incident laser light to form a third-harmonic wave.

4. The method according to claim 1, wherein the laser light consisting of two second-harmonic waves is used as the incident laser light to form a fourth-harmonic wave.

5. The method according to claim 1, wherein beta-barium borate, potassium dihydrogen phosphate or lithium formate monohydrate is used as a nonlinear optical crystal.

6. The method according to claim 2, wherein beta-barium borate, potassium dihydrogen phosphate or lithium formate monohydrate is used as a nonlinear optical crystal.

7. The method according to claim 3, wherein beta-barium borate, potassium dihydrogen phosphate or lithium formate monohydrate is used as a nonlinear optical crystal.

8. The method according to claim 4, wherein beta-barium borate, potassium dihydrogen phosphate or lithium formate monohydrate is used as a nonlinear optical crystal.

* * * * *